United States Patent Office 2,817,386
Patented Dec. 24, 1957

2,817,386

PLASTICIZED NUCLEAR ALKYLPHENOL-FORMALDEHYDE RESINS AND PAPER LAMINATES PREPARED THEREFROM

George Counos, Springfield, Mass., assignor to Monsanto Chemical Company, St. Louis, Mo., a corporation of Delaware No Drawing. Application November 22, 1955
Serial No. 548,655

10 Claims. (Cl. 154—2.6)

This invention relates to plasticized nuclear alkylphenol-formaldehyde resin compositions and to paper laminates prepared therefrom. More particularly, the present invention relates to paper laminates prepared from plasticized nuclear alkylphenol-formaldehyde resin compositions and which have improved physical and electrical insulating properties.

Nuclear alkylphenol-formaldehyde resins, e. g., cresol-formaldehyde resins, are well known in the art. A major application of such resins lies in the manufacture of paper laminates. In particular, such laminates are strong and have good electrical insulating properties. Because of their combination of strength and electrical insulating properties, such laminates are widely used as a base on which electrical circuits are printed. A factor which limits the further acceptance of such laminates in the printed circuit art is the inherent brittleness of the laminates. When cutouts are made in such laminates with punching tools, many of the holes cut therein have ragged or chipped edges. The punching properties of these laminates can be improved considerably by incorporating ester type plasticizers in the resins, but such improved punching properties are obtained only with a concomitant sacrifice in the electrical insulating properties of the laminates.

It is an object of this invention to provide improved plasticized nuclear alkylphenol-formaldehyde resin compositions.

Another object of this invention is to provide improved paper laminates that are prepared from novel plasticized nuclear alkylphenol-formaldehyde resin compositions.

Other objects and advantages of this invention will become apparent from the following detailed description thereof.

In accordance with the present invention, the properties of nuclear alkylphenol-formaldehyde resin compositions are improved by incorporating therein a plasticizing quantity of a material selected from the group consisting of phenethyl phenols, phenisopropyl phenols and mixtures thereof. Paper laminates prepared from such plasticized nuclear alkylphenol-formaldehyde resin compositions have improved physical properties, particularly with respect to the ease of punching cutouts from such laminates, and in addition have excellent electrical insulating properties.

The following examples are set forth to illustrate more clearly the principle and practice of this invention to those skilled in the art. All parts are by weight.

EXAMPLE I

A cresol-formaldehyde resin is prepared by mixing 100 parts of commercial cresol (B. P. 200–210° C., 48% m-cresol, 29% p-cresol, 4% o-cresol and 16% xylenol), 71 parts formalin (37% formaldehyde) and 2 parts hexamethylenetetramine and heating to 90° C. under vacuum reflux until a 50 weight percent ethyl alcohol solution of the resin has a viscosity of 20 centipoises at 25° C. (measured by the Ostwald method). The resin is then dehydrated under 25 inches of vacuum to an end temperature of 75° C. and thinned with ethyl alcohol to 60 weight percent solids.

EXAMPLE II

Part A

Two-tenths of 1% of 96% sulfuric acid is added to 1 mol portion of phenol. The phenol is heated to 60° C. and 1 mol portion of styrene is added dropwise to the phenol with vigorous stirring. Upon the first addition of styrene, a vigorous exothermic reaction takes place and the source of external heat is removed. The rate of styrene addition is controlled so that the reaction temperature gradually rises to 125° C. and is maintained at this temperature. The liquid reaction product consists predominantly of monophenethylphenol, but also contains a small amount of unreacted phenol and di- and triphenethylphenols.

Part B

Part A of this example is repeated except that 1.6 mols of styrene is added per mol portion of phenol.

Part C

Part A of this example is repeated except that 2 mols of styrene is added per mol portion of phenol.

Part D

Part A of this example is repeated except that 2.6 mols of styrene is added per mol portion of phenol.

EXAMPLE III

A solution of resin and plasticizer is prepared by incorporating 35 parts of the styrene-phenol reaction product of Example II, Part C and 7 parts of methyl abietate in 100 parts of the cresol-formaldehyde resin solution of Example I. The methyl abietate is employed to promote the compatibility of the resin and plasticizer.

Several sheets of 10 mil bleached kraft paper are impregnated by dipping them slowly in the laminating syrup described in the paragraph immediately above, withdrawing the paper slowly from the syrup and wiping away excess impregnant with a doctor bar. The impregnated paper sheets are dried for 15 minutes at 120° C.

Laminates are prepared by assembling 8 sheets of the dried, resin-impregnated sheets described in the paragraph immediately above and molding them for 15 minutes at 150° C. under a pressure of 1000 p. s. i.

The punching properties of the laminates at room temperature are evaluated by ASTM test procedure D617–44. The laminates punch well and are definitely superior to laminates prepared from the same cresol-formaldehyde resin which does not contain the styrene-phenol reaction product as a plasticizer.

A second punching test is run employing the same test procedure. In this test, however, the laminates are heated for 15 minutes in a 65° C. oven immediately before punching. The punching quality of the laminates is superior to the results obtained at room temperature.

The electrical insulating properties of the laminates are good with the laminates having a power factor of 0.030 and a dielectric constant of 4.28, both values being measured at 1 megacycle.

The water absorption of the laminates is low, the water pickup being only 0.75% after a 24 hour immersion in water at 23° C. The water soaking has only a slight effect upon the electrical insulating properties of the laminates, the power factor increasing to 0.037 and the dielectric constant increasing to 4.38.

EXAMPLE IV

A plasticized laminating syrup is prepared by incorporating 42 parts of the styrene-phenol reaction product of Example II, Part B and 7 parts of methyl abietate (added as a mutual solubilizer) in 100 parts of the cresol-formaldehyde resin solution of Example I. Paper laminates are prepared from this plasticized laminating resin by the procedure described in Example III. The punching properties of the laminates compare favorably with those of the laminates described in Example III.

EXAMPLE V

A plasticized laminating syrup is prepared by incorporating 20 parts of the styrene-phenol reaction product of Example II, Part D, in the cresol-formaldehyde resin solution of Example I. Paper laminates prepared from this plasticized resin have punching properties comparable to those of the laminates described in Examples III and IV.

EXAMPLE VI

A plasticized laminating syrup is prepared by incorporating 47 parts of the styrene-phenol reaction product of Example II, Part A and 7 parts of methyl abietate (added as a mutual solubilizer) in 100 parts of the cresol-formaldehyde resin of Example I. The punching properties of laminates prepared from this resin are good.

The resin components of the plasticized resin compositions of this invention are formaldehyde condensates of nuclear alkyl substituted monohydric phenols. The phenols from which said resins are prepared contain up to 2 alkyl substituents and such alkyl substituents may contain 1-6 carbon atoms. Examples of such phenols include o-cresol, m-cresol, p-cresol, o-ethylphenol, m-ethylphenol, p-ethylphenol, p-tertiary butylphenol, the various isomeric xylenols, 3-5 dialkylphenols, etc. Preferably the resins are derived from cresols or xylenols. It is not necessary and, in fact, it is undesirable to employ a single phenol. As is well known in the art, a small quantity of a phenol that will react with 3 molar proportions of formaldehyde must be employed in the resin preparation to obtain compositions that will cross-link. Usually a meta substituted alkylphenol will be employed for this purpose, although a small quantity of phenol itself may be employed if desired. The formaldehyde is most conveniently employed in the form of formalin, but anhydrous forms of formaldehyde such as paraformaldehyde and trioxymethylene also may be used. The ratio of formaldehyde to the phenol is not critical and may be varied widely.

The plasticizers incorporated in the nuclear alkyl substituted phenol-formaldehyde resins are phenethylphenols, phenisopropylphenols and mixtures thereof. These plasticizers are prepared conveniently by condensing styrene or alpha methyl styrene with a phenol in the presence of a Friedel-Crafts catalyst such as sulphuric acid. When phenol itself is employed as the phenolic compound, 1, 2 or 3 mols of styrene (or alpha methylstyrene) may be condensed with 1 mol of the phenol. Typical examples of the phenols from which the plasticizers may be derived include phenol itself, cresols, xylenols, aminophenols, chlorophenols, nitrophenols, thymol, naphthols, resorcinol, pyrocatechol, pyrogallol, hydroquinone, oxyhydroquinone, phloroglucinol, mesitol, etc. In lieu of styrene and alpha methyl styrene, their nuclear alkyl-substituted homologues may be employed in the preparation of the plasticizers.

The compatability of the plasticizer with the resin tends to fall off as the number of phenethyl or phenisopropyl groups on the phenolic ring is increased. Where the compatability of the plasticizer with the resin is lower than desired, it may be improved by incorporating a small percentage of a rosin acid ester in the resin as a mutual solvent. Such addition of rosin ester is merely desirable and is not absolutely necessary.

In addition to the resin and plasticizer, the plasticized resin compositions of this invention also may contain conventional plastic compounding agents such as colorants, pigments, fillers, lubricants, antioxidants, stabilizers, etc.

The paper laminates of this invention are prepared from the plasticized nuclear alkyl substituted phenol-formaldehyde resins by conventional laminating techniques. Any of the papers presently used in the paper laminating art may be employed in the preparation of the novel laminates of this invention. In some cases, the laminates also may be prepared from cellulosic textile materials.

The above descriptions and particularly the examples are set forth by way of illustration only. Obviously many variations and modifications thereof can be made without departing from the spirit and scope of the invention herein disclosed.

What is claimed is:

1. A water-soluble nuclear alkylphenol-formaldehyde resin having homogeneously incorporated therein a plasticizing quantity of a material of the group consisting of phenethyl phenols, phenisopropyl phenols and mixtures thereof, said nuclear alkylphenol-formaldehyde resin consisting essentially of a binary condensation product of a nuclear alkylphenol and formaldehyde.

2. The compositions of claim 1 in which the water-soluble nuclear alkylphenol-formaldehyde resin employed is selected from the group consisting of cresol-formaldehyde and xylenol-formaldehyde resins.

3. The compositions of claim 1 in which the water-soluble nuclear alkylphenol-formaldehyde resin employed is a cresol-formaldehyde resin.

4. A paper laminate comprising a plurality of paper sheets impregnated and bonded with a plasticized resin composition of claim 1, said plasticized resin having been cured in situ in the laminate to an insoluble, infusible state under heat and pressure.

5. The compositions of claim 1 in which the plasticizing agent employed is a Friedel-Crafts catalyzed condensation product of 1 molar proportion of phenol and 1-3 molar proportion of styrene.

6. A paper laminate comprising a plurality of paper sheets impregnated and bonded with the plasticized resin composition of claim 5, said plasticized resin having been cured in situ in the laminate to an insoluble, infusible state under heat and pressure.

7. The compositions of claim 2 in which the plasticizing agent employed is a Friedel-Crafts catalyzed condensation product of 1 molar proportion of phenol and 1-3 molar proportion of styrene.

8. The compositions of claim 1 in which the plasticizing agent employed is a Friedel-Crafts catalyzed condensation product of 1 molar proportion of phenol and 1-3 molar proportion of alpha-methyl styrene.

9. The compositions of claim 2 in which the plasticizing agent employed is a Friedel-Crafts catalyzed condensation product of 1 molar proportion of phenol and 1-3 molar proportion of alpha-methyl styrene.

10. A composition comprising 100 parts of a water-soluble resin consisting essentially of a binary condensation product of cresol and formaldehyde and 33-78 parts of a material of the group consisting of phenethyl phenols, phenisopropyl phenols and mixtures thereof.

References Cited in the file of this patent

UNITED STATES PATENTS

| | | |
|---|---|---|
| 2,374,316 | Whiting | Apr. 24, 1945 |
| 2,415,763 | Ryan | Feb. 11, 1947 |
| 2,502,003 | Geiger | Mar. 28, 1950 |
| 2,602,076 | Teot | July 1, 1952 |
| 2,668,802 | Evans et al. | Feb. 9, 1954 |
| 2,675,335 | Rankin et al. | Apr. 13, 1954 |